(12) United States Patent
Yamaguchi

(10) Patent No.: US 9,982,131 B2
(45) Date of Patent: May 29, 2018

(54) AUTOMOBILE INTERIOR COMPONENT FORMED OF REINFORCED POLYPHENYLENE ETHER-BASED RESIN COMPOSITION

(71) Applicant: ASAHI KASEI KABUSHIKI KAISHA, Tokyo (JP)

(72) Inventor: Toru Yamaguchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 14/810,582

(22) Filed: Jul. 28, 2015

(65) Prior Publication Data

US 2016/0032092 A1    Feb. 4, 2016

(30) Foreign Application Priority Data

Jul. 31, 2014    (JP) .................................. 2014-156986

(51) Int. Cl.
| | | |
|---|---|---|
| C08L 25/06 | (2006.01) | |
| C08L 71/12 | (2006.01) | |
| C08K 7/14 | (2006.01) | |
| C08L 51/04 | (2006.01) | |

(52) U.S. Cl.
CPC ................ *C08L 71/12* (2013.01); *C08K 7/14* (2013.01); *C08L 51/04* (2013.01)

(58) Field of Classification Search
CPC .......... C08L 25/04; C08L 25/06; C08L 71/12; C08K 7/14
See application file for complete search history.

(56) References Cited

U.S. PATENT DOCUMENTS

| | | |
|---|---|---|
| 5,156,920 A | 10/1992 | Aycock et al. |
| 2003/0139528 A1 | 7/2003 | Okada et al. |
| 2013/0231430 A1* | 9/2013 | I .............................. C08L 53/025 524/323 |

FOREIGN PATENT DOCUMENTS

| | | |
|---|---|---|
| EP | 0 432 641 A2 | 6/1991 |
| EP | 0779339 A2 | 6/1997 |
| EP | 0808871 A1 | 11/1997 |
| JP | 60-36554 A | 2/1985 |
| JP | S62-241958 A | 10/1987 |
| JP | S63-118366 A | 5/1988 |
| JP | H02-199164 A | 8/1990 |
| JP | H03-229756 A | 10/1991 |
| JP | H08-183902 A | 7/1996 |
| JP | H09-157488 A | 6/1997 |
| JP | H09-157515 A | 6/1997 |
| JP | H11-279347 A | 10/1999 |
| JP | H11-279349 A | 10/1999 |
| JP | 2011-246681 A | 12/2011 |

\* cited by examiner

*Primary Examiner* — Peter D. Mulcahy
(74) *Attorney, Agent, or Firm* — Greenblum & Bernstein, P.L.C.

(57) ABSTRACT

This disclosure is to provide an automobile interior component formed of a reinforced polyphenylene ether-based resin composition, which is excellent in both urethane adhesion and in appearance after molding, mechanical properties such as tensile strength, bending strength and the like, and resident molding stability; and further has sufficient molding fluidity. Provided is an automobile interior component formed of a reinforced polyphenylene ether-based resin composition, containing a polyphenylene ether (A) whereof the reduced viscosity (chloroform solvent, measured at 30° C.) in the molded product is 0.30 to 0.45 dl/g, a styrene resin (B) and a glass fiber (C), where the content of the component (A) is 10 to 30 mass %, the content of the component (B) is 40 to 85 mass %, and the content of the component (C) is 5 to 30 mass % with respect to 100 mass % in total of the components (A) to (C).

4 Claims, No Drawings

AUTOMOBILE INTERIOR COMPONENT FORMED OF REINFORCED POLYPHENYLENE ETHER-BASED RESIN COMPOSITION

TECHNICAL FIELD

This disclosure relates to an automobile interior component formed of reinforced polyphenylene ether-based resin composition.

BACKGROUND

A polyphenylene ether is ordinarily compounded with, for examples, resins such as styrene resin and the like, at a ratio depending on the essential level of heat resistance and molding fluidity, to obtain a polyphenylene ether-based resin; and it is possible to compound into the polyphenylene ether-based resin elastomer components and additive components such as flame retardant, inorganic filler, heat stabilizer and the like, depending on further demands, and to afterwards use the same as a resin composition. Polyphenylene ether-based resins and resin compositions thereof are excellent in heat resistance, mechanical properties, molding workability, acid and alkali resistance, size stability and electronic properties, etc., and are thus widely used in the fields of, for example, consumer electronics, office automation, office equipment, information equipment, automobiles, etc. In particular, automobile interiors (for example, instrument panel components, etc.) ordinarily require heat resistance, mechanical properties (for example, impact resistance, rigidity, etc.), and using of polyphenylene ether-based resins and resin compositions thereof is considered.

However, for most automobile interior components, inclusive of instrument panel components, etc., the surrounding area thereof is covered with foamed urethane, in consideration of the product properties, while ordinarily, a polyphenylene ether-based resin and a resin composition thereof formed of polyphenylene ether and styrene-based resin are not necessarily excellent in adhesion with foamed urethane (hereinafter referred to as "urethane adhesion").

Conventionally, in order to improve adhesion of resin compositions containing polyphenylene ether and styrene-based resins with foamed urethane, proposed are a method of compounding a polar polymer component such as ABS resin, SMA resin and the like (for example, see JPS60-36554A (PTL 1) and JPS63-118366A (PTL 2)), and a method of compounding a terpene-phenol resin (for example, see JPH2-199164A (PTL 3) and JPH9-157515A (PTL 4)).

CITATION LIST

Patent Literature

PTL 1: JPS60-36554A
PTL 2: JPS63-118366A
PTL 3: JPH2-199164A
PTL 4: JPH9-157515A

However, in the methods disclosed in PTL 1 and PTL 2 of compounding a polar polymer composition, in the case that the polar polymer is inferior in miscibility with polyphenylene ether-based resins, and is thus compounded at a sufficient amount in order to improve adhesion with foamed urethane, there is a probability that the obtained molded product suffers delamination and is deteriorated in mechanical properties. In addition, in the methods disclosed in PTL 3 and PTL 4 of compounding a terpene-phenol resin, although it is possible to improve adhesion with foamed urethane and molding fluidity by compounding the terpene-phenol resins at a sufficient amount, stability when the resin is resident in, for example, a molding machine (hereinafter referred to as "resident molding stability") is reduced. Therefore, when molding a large automobile interior component with a long molding cycle such as instrument panel component and the like, there is a probability that silver streaks, etc. are generated, causing a poor appearance.

Considering such problems, this disclosure is to provide an automobile interior component, in particular, an instrument panel component formed of a reinforced polyphenylene ether-based resin composition, which is excellent in both urethane adhesion and in appearance after molding, mechanical properties such as tensile strength, bending strength and the like, and resident molding stability, and further has sufficient molding fluidity.

SUMMARY

After intensive study, we have discovered that by adjusting to a specific value reduced viscosity of the polyphenylene ether in the resin composition, compounding the same at a specific amount, and further compounding a glass fiber at a specific amount, it is possible to improve urethane adhesion of the resin composition, and simultaneously achieve excellent appearance after molding, mechanical properties, resident molding stability and molding fluidity, enabling effective usage of the same in automobile interior components, and thereby have achieved this disclosure.

In other words, this disclosure is:

[1] An automobile interior component formed of a reinforced polyphenylene ether-based resin composition, containing: a polyphenylene ether (A) whereof the reduced viscosity in the molded product (chloroform solvent, measured at 30° C.) is 0.30 to 0.45 dl/g; a styrene-based resin (B); and a glass fiber (C), wherein
the content of the component (A) is 10 to 30 mass %, the content of the component (B) is 40 to 85 mass %, and the content of the component (C) is 5 to 30 mass %, in 100 mass % in total of the components (A) to (C).

[2] The automobile interior component formed of the reinforced polyphenylene ether-based resin composition in the aforementioned [1], wherein the number of terminal OH groups of the polyphenylene ether of the component (A) in the molded product is 100 to 200 μmol/g.

[3] The automobile interior component formed of the reinforced polyphenylene ether-based resin composition in the aforementioned [1], wherein the component (C) is a glass fiber sized with a urethane sizing agent.

[4] The automobile interior component formed of the reinforced polyphenylene ether-based resin composition in the aforementioned [2], wherein the component (C) is a glass fiber sized with a urethane sizing agent.

[5] The automobile interior component formed of the reinforced polyphenylene ether-based resin composition in the aforementioned [1], wherein the automobile interior component is an instrument panel component.

[6] The automobile interior component formed of the reinforced polyphenylene ether-based resin composition in the aforementioned [2], wherein the automobile interior component is an instrument panel component.

[7] The automobile interior component formed of the reinforced polyphenylene ether-based resin composition in the aforementioned [3], wherein the automobile interior component is an instrument panel component.

[8] The automobile interior component formed of the reinforced polyphenylene ether-based resin composition in the aforementioned [4], wherein the automobile interior component is an instrument panel component.

The automobile interior component formed of the reinforced polyphenylene ether-based resin composition of this disclosure is excellent in urethane adhesion, and excellent as well in appearance after molding, mechanical properties such as tensile strength, bending strength and the like, resident molding stability and molding fluidity, and thus can be efficiently used as an automobile interior component, in particular, an instrument panel component.

DETAILED DESCRIPTION

An embodiment of this disclosure (hereinafter referred to as "the present embodiment") is described in details in the following. This disclosure is not limited to the following description, but may be selected from a variation within the scope of the subject thereof.

[Reinforced Polyphenylene Ether-Based Resin Composition]

The reinforced polyphenylene ether-based resin composition of the present embodiment (hereinafter referred to as "the resin composition") contains a polyphenylene ether (A) whereof the reduced viscosity in the molded product obtained by molding the resin composition (chloroform solvent, measured at 30° C.) is 0.30 to 0.45 dl/g, a styrene resin (B) and a glass fiber (C), where the content of the component (A) is 10 to 30 mass %, the content of the component (B) is 40 to 85 mass %, and the content of the component (C) is 5 to 30 mass % with respect to 100 mass % in total of the components (A) to (C).

(Polyphenylene Ether (A))

The polyphenylene ether (A) used in the resin composition of this disclosure has a repeating unit in the general formulas (1) and/or (2), where the unit is preferably formed of a homopolymer of general formula (1) or (2), or a copolymer.

[Chem. 1]

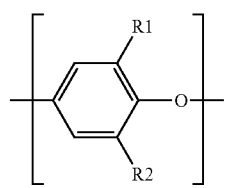

General Formula (1)

[Chem. 2]

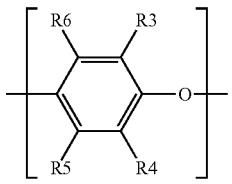

General Formula (2)

In the aforementioned general formulas (1) and (2), R1, R2, R3, R4, R5 and R6 may each independently be any one selected from the group consisting of alkyl groups having 1 to 4 carbon atoms, aryl groups having 6 to 12 carbon atoms, and a monovalent residue such as halogens, hydrogen and the like, except the case that R5 and R6 are both hydrogen atoms.

In addition, the number of carbon atoms of the alkyl group is preferably 1 to 3, the number of carbon atoms of the aryl group is preferably 6 to 8, and the monovalent residue is preferably hydrogen.

Further, the number of repeating units in the aforementioned general formulas (1) and (2) may be various depending on molecular weight distribution of the polyphenylene ether (A), and are thus not specifically limited.

In the polyphenylene ether (A), the homopolymer may be selected from, but is not limited to, for example, poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether, poly(2-methyl-6-chloroethyl-1,4-phenylene)ether, etc. In particular, from the viewpoint of easiness to obtain materials and workability, poly(2,6-dimethyl-1,4-phenylene)ether is preferable.

In the polyphenylene ether (A), the copolymer may be, but is not limited to, one having a main body of a polyphenylene ether structure, for example, a copolymer of 2,6-dimethylphenol and 2,3,6-trimethylphenol, a copolymer of 2,6-dimethylphenol and o-cresol, and a copolymer of 2,3,6-trimethylphenol and o-cresol.

In particular, from the viewpoint of easiness to obtain materials and workability, a copolymer of 2,6-dimethylphenol and 2,3,6-trimethylphenol is preferable, and from the viewpoint of improvement of physical properties, a copolymer of 90 to 70 mass % of 2,6-dimethylphenol and 10 to 30 mass % of 2,3,6-trimethylphenol is more preferable.

Each polyphenylene ether (A) as mentioned above can be used either singly or in a combination of 2 or more.

The polyphenylene ether (A) may contain various phenylene ether units other than the aforementioned general formulas (1) and (2) as a partial structure, as long as heat resistance of the polyphenylene ether (A) is not reduced too much.

Such phenylene ether units may be selected from, but is not limited to, for example, the 2-(dialkylaminomethyl)-6-methylphenylene ether unit and the 2-(N-alkyl-N-phenylaminomethyl)-6-methylphenylene ether unit disclosed in JPH01-297428A and JP563-301222A.

The polyphenylene ether (A) may have diphenoquinone, etc. compounded in the main chain of the polyphenylene ether at a low amount.

From the view point of further improvement of urethane adhesion, the polyphenylene ether (A) may be partially replaced with a functional polyphenylene ether modified with an unsaturated carboxylic acid or a functional derivative thereof. In this case, the modification may be performed with an unsaturated carboxylic acid or a functional derivative thereof singly or in a combination of two or more.

From the viewpoint of resident molding stability, compounding of the aforementioned functional polyphenylene ether is preferably performed to 10 mass % or less of the entire resin composition. From the same viewpoint, the compounding is more preferably 5 mass % or less, further more preferably 3 mass % or less.

From the viewpoint of sufficient urethane adhesion of the molded product, reduced viscosity (chloroform solvent, measured at 30° C.) of the polyphenylene ether during molding of this disclosure should be within the range of 0.30 to 0.45 dl/g. From the same viewpoint, the reduced viscosity is preferably within the range of 0.32 to 0.45 dl/g, more preferably within the range of 0.32 to 0.43 dl/g.

Further, the "reduced viscosity" in this disclosure is measured by using a Ubbelohde viscometer in a solution of 0.5 g/dl with a chloroform solvent at 30° C.

Reduced viscosity of the polyphenylene ether (A) in the molded product can be measured by using a Ubbelohde viscometer in a solution of 0.5 g/dl with a chloroform solvent at 30° C., as mentioned above, after separating polyphenylene ether from the molded product with the procedure as follows. First, dissolve approximately 2 g of the molded product in 100 g of chloroform, filter and remove insolubles (glass fiber, colorant, etc.), and afterwards precipitate polymer components by adding methanol 3 times or more in volume, while stirring the filtrate with a stirrer. Filter the precipitated polymer components, wash the same with methanol, dry the same for 3 hours in a vacuum volatilization furnace at 130° C., and afterwards further dissolve the dried polymers in 100 g of toluene. Subject the toluene solution with the polymer dissolved therein to a centrifuge separator of 20000 rpm for 2 hours, precipitate and separate insoluble polymer components other than the polyphenylene ether in the molded product, for example, insoluble rubber components, and separate toluene solution components from the solution after centrifugation. Add methanol 3 times or more in volume to precipitate polymer components while stirring the separated toluene solution with a stirrer, and afterwards separate the filtered polymer components. Dry the polymer components in a volatilization furnace at 130° C. for 3 hours, and dissolve the same in 50 g of methylene chloride at 50° C. After placing in a freezer at −30° C. for 24 hours, filter the precipitated polyphenylene ether and wash the same with methylene chloride at −30° C., and dry the same in a vacuum volatilization furnace at 130° C. for 3 hours, to obtain a dry polyphenylene ether.

Reduced viscosity (chloroform solution, measured at 30° C.) of the polyphenylene ether polymer powder used previously as a material is preferably within a range of 0.27 to 0.41 dl/g. It is possible to maintain sufficient mechanical properties of the resin composition by setting the reduced viscosity to be 0.27 dl/g or more, and to efficiently adjust reduced viscosity of the polyphenylene ether when subjected to extrusion by setting the reduced viscosity to be 0.41 dl/g or less. From the same viewpoint, the reduced viscosity is preferably within the range of 0.30 to 0.40 dl/g, more preferably within the range of 0.33 to 0.40 dl/g, further more preferably within the range of 0.33 to 0.38 dl/g.

The polyphenylene ether (A) in the molded product of this disclosure is preferably adjusted within a range that the number of terminal OH groups in the molded product is 100 to 200 µmol/g. If the number of terminal OH groups is less than 100 µmol/g, there is a risk that urethane adhesion of the resin composition is reduced. In addition, if the number of terminal OH groups is more than 200 µmol/g, there is a risk that although urethane adhesion is excellent, mechanical strength and high-temperature resident molding stability is reduced to an insufficient level. From the same viewpoint, the number of terminal OH groups is more preferably within a range of 120 to 180 µmol/g, further more preferably within a range of 130 to 170 µmol/g.

The number of terminal OH groups of the polyphenylene ether (A) in the molded product of this disclosure can be solved through the following operations. After adjusting the polyphenylene ether separated from the molded product to a methylene chloride solution as mentioned above, it is possible to use an ultra-violet and visible spectrophotometric to measure the absorbance at a measurement wavelength of 318 nm, to thereby calculate the number of phenolic OH groups.

The method for polymerizing the polyphenylene ether (A) is not specifically limited, but is preferably solution polymerization, from the viewpoint of adjustment of the reduced viscosity and the number of terminal OH groups in the molded product. Specifically, the solution polymerization is to perform oxidative polymerization reaction of a monomer (for example, 2,6-dimethylphenol) with existence of oxygen in a solvent such as toluene and the like, using a cuprous salt and an amine compound as catalysts. Next, deactivate the catalyst using a method such as adding, for example, a compound which forms a chelate compound with copper to the obtained polyphenylene ether solution, and afterwards stir the polyphenylene ether solution under an atmosphere avoided from mixture of oxygen at a temperature of 24 to 70° C. Next, precipitate polyphenylene ether by adding methanol, etc., and further separate the polyphenylene ether from the solution, wash and dry the same, and afterwards obtain the polyphenylene ether polymer powder as a material of the present resin composition.

In the resin composition of the present embodiment, the content of the polyphenylene ether (A) in 100 mass % of the total amount of the polyphenylene ether (A), whereof the reduced viscosity (chloroform solvent, measured at 30° C.) in the molded product is 0.30 to 0.45 dl/g, the styrene resin (B) and the glass fiber (C) is within a range of 10 to 30 mass %. By setting the content to be 10 mass % or more, it is possible to achieve sufficient heat resistance and urethane adhesion, and by setting the content to be 30 mass % or less, it is possible to improve the molding fluidity. From the same viewpoint, the content is preferably within a range of 10 to 21 mass %, and more preferably within a range of 15 to 20 mass %.

(Styrene Resin (B))

In the resin composition of the present embodiment, the styrene resin (B) is a polymer obtained by polymerizing a styrene compound, or a styrene compound and a compound which is capable of copolymerizing therewith, with or without existence of a rubber polymer.

The styrene compound may be, but is not limited to, for example, styrene, α-methylstyrene, 2,4-dimethylstyrene, monochlorostyrene, p-methylstyrene, p-tert-butylstyrene, ethylstyrene, etc. From the viewpoint of utility of material, the styrene compound is preferably styrene.

The compound which is capable of copolymerizing with the styrene compound may be, but is not limited to, for example, methacrylic acid esters such as methyl methacrylate, ethyl methacrylate and the like; unsaturated nitrile compounds such as acrylonitrile, methacrylonitrile and the like, etc.

The rubber polymer may be, but is not limited to, for example, polybutadiene.

From the viewpoint of mechanical properties of the molded product, the styrene resin (B) is preferably polystyrene, high impact polystyrene (HIPS) or a mixture thereof.

In the resin composition of the present embodiment, the content of the styrene resin (B) in 100 mass % of the total amount of the polyphenylene ether (A), whereof the reduced viscosity (chloroform solvent, measured at 30° C.) in the molded product is 0.30 to 0.45 dl/g, the styrene resin (B) and the glass fiber (C) is within a range of 40 to 85 mass %. By setting the content to be 40 mass % or more, it is possible to improve molding fluidity of the resin composition of the present embodiment, and by setting the content to be 85 mass % or less, it is possible to maintain sufficient heat resistance. From the same viewpoint, the content is preferably within a range of 50 to 80 mass %, and more preferably within a range of 55 to 75 mass %.

(Glass Fiber (C))

The glass fiber (C) is compounded into the resin composition of the present embodiment for the purpose to further improve mechanical strength and urethane adhesion.

The type of glass of the glass fiber (C) may be those well known, for example, E glass, C glass, S glass or A glass. Average fiber diameter of the glass fiber (C) is preferably within a range of 5 to 15 μm. By setting average fiber diameter of the glass fiber (C) to be 5 μm or more, it is possible to prevent reduction in rigidity, heat resistance, impact resistance, durability, etc. of the molded product due to breakage of fiber during extrusion and molding, and improve production stability, and by setting average fiber diameter of the glass fiber (C) to be 15 μm or less, it is possible to achieve sufficient mechanical properties, and maintain the appearance of the molding surface. From the same viewpoint, average fiber diameter of the glass fiber (C) is preferably within a range of 7 to 13 μm.

From the viewpoint of improvement of handleability and affinity with resins, the glass fiber (C) used in the resin composition of the present embodiment is preferably a glass fiber sized with a sizing agent, where from the view point of improvement of urethane adhesion, the sizing agent is preferably a urethane sizing agent and an epoxy sizing agent, more preferably a urethane agent.

The glass fiber (C) used in the present embodiment can be a surface-treated glass fiber, where as specific examples of a silane compound used in the surface treatment are vinylsilane compounds such as vinyltrichlorosilane, vinyltriethoxysilane, γ-methacryloxypropyltrimethoxysilane and the like, epoxysilane compounds such as γ-glycidoxypropyltrimethoxysilane and the like, sulfur silane compounds such as bis-(3-triethoxysilylpropyl)tetrasulfide and the like, mercaptosilane compounds such as γ-mercaptopropyl trimethoxysilane and the like, aminosilane compounds such as γ-aminopropyltriethoxysilane, γ-ureidopropyltriethoxysilane and the like, etc. For the purpose of this disclosure to achieve sufficient mechanical strength and improvement of urethane adhesion, in particular, silane compound and aminosilane compounds are preferable. Said silane compounds can be used in a combination of two or more.

In addition, in the present embodiment, surface treatment can be performed by using a premixture of said silane compound and a sizing agent such as epoxy-based sizing agent, urethane-based sizing agent and the like.

In the resin composition of the present embodiment, the content of the glass fiber (C) in 100 mass % of the total amount of the polyphenylene ether (A), whereof the reduced viscosity (chloroform solvent, measured at 30° C.) in the molded product is 0.30 to 0.45 dl/g, the styrene resin (B) and the glass fiber (C) is within a range of 5 to 30 mass %. By setting the content to be 5 mass % or more, it is possible to improve mechanical properties and urethane adhesion of the resin composition of the present embodiment, and by setting the content to be 30 mass % or less, it is possible to maintain appearance of the molded product. From the same viewpoint, the content is preferably within a range of 10 to 25 mass %, and more preferably within a range of 10 to 20 mass %.

(Other Materials)

In the resin composition of the present embodiment, within a range that mechanical properties, urethane adhesion, resident molding stability and appearance of molded product surface are not deteriorated significantly, it is possible to contain an elastomer component for the purpose of improvement of impact resistance. From the viewpoint of maintenance of mechanical properties other than impact resistance, the content of the elastomer component is preferably within a range of 10 parts by mass or less with respect to 100 parts by mass of the total amount of the components (A), (B) and (C). From the viewpoint of both further improvement of impact resistance and further maintenance of mechanical properties other than impact resistance, the content is preferably within a range of 0.1 to 8 parts by mass, and more preferably within a range of 0.5 to 4 parts by mass.

In the resin composition of the present embodiment, within a range that heat resistance, mechanical properties, urethane adhesion, resident molding stability and appearance of molded product surface are not deteriorated significantly, it is possible to further contain 0.001 to 3 parts by mass of antioxidant, UV absorber, stabilizer such as heat stabilizer and the like, colorant, mold release, etc. with respect to 100 parts by mass of the total amount of the components (A), (B) and (C). By setting the content of the aforementioned antioxidant, etc. to be 0.001 parts by mass or more, it is possible to express a sufficient effect of addition, and by setting the content of the aforementioned antioxidant, etc. to be 3 parts by mass or less, it is possible to maintain physical properties of the resin composition. From the same viewpoint, the content of the aforementioned antioxidant, etc. is preferably within a range of 0.01 to 2 mass %, and more preferably within a range of 0.2 to 1 mass %.

In the resin composition of the present embodiment, in a range that urethane adhesion, resident molding stability, appearance of molded product surface, and impact resistance are not significantly deteriorated, for the purpose of further improvement of mechanical properties, it is possible to contain 0.5 to 10 parts by mass of an inorganic filler other than glass fiber with respect to 100 parts by mass of the total amount of the components (A), (B) and (C). By setting the content to be 0.5 parts by mass or more, it is possible to sufficiently express the effect of addition, and by setting the content to be 10 parts by mass or less, it is possible to sufficiently maintain appearance of the molded product. From the same viewpoint, the content is preferably 1 to 10 parts by mass, and more preferably 2 to 8 parts by mass.

Further, the inorganic filler other than glass fiber may be, but is not limited to, for example, carbon fiber, mica, glass flake, talc, glass milled fiber, chlorite, wollastonite, etc.

[Method for Producing the Resin Composition]

The resin composition of the present embodiment can be produced by melting and kneading the component (A), the component (B), the component (C) and, if necessary, other materials.

The method for producing the resin composition of the present embodiment is preferably, but is not limited to, using a twin screw extruder from the viewpoint of production efficiency, for the purpose of massive and stable production of the resin composition.

The screw diameter of the twin screw extruder is preferably within a range of 25 to 90 mm, and from the viewpoint of mass productivity, is more preferably within a range of 40 to 70 mm. For example, a method for melting and kneading at a condition of cylinder temperature 270 to 330° C., screw rotating rate 150 to 450 rpm, extrusion rate 40 to 220 kg/h, using a ZSK40MC twin screw extruder (made by Werner & Pfleiderer, Germany, barrels: 13, screw diameter: 40 mm, L/D=50; at a screw pattern that kneading discs L: 2, kneading discs R: 6, and kneading discs N: 4), and a method for melting and kneading at a condition of cylinder temperature 270 to 330° C., screw rotation number 150 to 500 rpm, extrusion rate 200 to 600 kg/h, using a TEM58SS twin screw extruder (made by Toshiba Machine Co., Ltd., barrels: 13, screw diameter: 58 mm, L/D=53; at a screw pattern that kneading discs L: 2, kneading discs R: 14, kneading discs N: 2) can be used as a preferable method.

Here, the "L" is the "screw barrel length" of the extruder, and the "D" is the "screw barrel diameter".

When producing the resin composition of the present embodiment using a twin screw extruder, from a viewpoint of granting heat resistance and mechanical properties to the material, it is preferable that the component (A) and the component (B) are fed from a feed at an uppermost stream of the extruder (top feed), and the component (C) is fed from a feed at a midstream of the extruder (side feed).

[Molded Product]

A molded product formed of the resin composition of the present embodiment is an automobile interior component, and can be obtained by forming the aforementioned resin composition.

The method for molding the resin composition is not specifically limited, but is preferably, for example, injection molding, extrusion molding, vacuum molding, pressure molding, etc., in particular, from the viewpoint of appearance and mass productivity of the molded product, is preferably injection molding.

Further, most of the automobile interior components as molded products of the present embodiment are ordinarily formed by adhering a molded body of the aforementioned resin composition with polyurethane (foamed urethane).

Here, the polyurethane includes all polymers having urethane bond (—NHCOO—), and may be a high molecular compound containing a single type of monomer having urethane bond, or a copolymer containing a combination of two or more types of such monomers. The properties such as molecular structure, molecular weight and the like are not specifically limited. In other words, the polyurethane which can be used in the molded product of the present embodiment is not specifically limited, but can be selected from polyurethanes having certain properties depending on the usage thereof. The polyurethane is ordinarily a foamed urethane. The polyurethane may contain conventional additives. The method for producing the polyurethane is one well known to a person skilled in the art.

An automobile interior component as a molded product of the present embodiment can be produced with a method of, for example, conducting a urethane material into a shaping mold having a molded product of the resin composition of this disclosure therein, and performing molding and hardening. In said method, the molded product of the resin composition of this disclosure and the polyurethane have to contact each other only during the hardening step, and do not have to contact each other since molding. In addition, there are other methods as well to spray floss a liquid of the urethane material to the molded product of the resin composition of this disclosure. In this method, it is possible to spray the urethane material to the hot molded product right after molding, or to spray the urethane to the molded product while warming the same. In addition, even by spraying the urethane material to the molded product and afterwards warming the same, it is possible to obtain a molded product where the two are adhered together. The method is not limited to the aforementioned ones, but may also be a method other than the same. As for the automobile interior component as a molded product of the present embodiment, for the purpose of further improvement of adhesion with polyurethane, the molded product thereof can be subjected to flame treatment. The flame treatment is a treatment to introduce oxygen bond or double bond to the molded product surface, by rotating or moving the molded product surface, to moderately pass the same over a flame of a flammable gas such as propane gas and the like. As for the flame treatment method, for example, a patent literature (JPH9-31221A) discloses examples for a method for flame treatment using a flame treater made by Flynn Burner Corp., U.S., a flame treater made by esseCI, Italy, etc., where the flame treater and the method can be used.

The molded product of the present embodiment is an automobile interior component, the automobile interior component including instrument panel component, center panel component, dashboard component, etc. Among the above, the molded product is preferably, in particular, an instrument panel component excellent in urethane adhesion, and significantly excellent as well in high-temperature resident molding stability, surface appearance of the molded product, and impact resistance.

EXAMPLES

In the following, this disclosure are described by using specific examples and comparative examples. This disclosure is not limited thereto.

Measuring methods and raw materials used in the examples and comparative examples are as follows.

(1. Measuring Method for Reduced Viscosity ($\eta sp/c$) of the Material Polyphenylene Ether Powder)

The measurement was performed at 30° C. by making polyphenylene ether a chloroform solution of 0.5 g/dl, using a Ubbelohde viscometer. The unit is represented with dl/g.

(2. Measuring Method of Reduced Viscosity ($\eta sp/c$) of the Polyphenylene Ether in the Molded Product)

Fragments of the molded product, formed of the resin compositions produced in the examples and the comparative examples, were dissolved at 2 g in 100 g of chloroform, and were filtered and removed insoluble matters (glass fiber); afterwards, the filtrate was stirred with a stirrer, and the polymer components therein were precipitated by adding 400 g of methanol. The precipitated polymer components were filtered, washed with methanol, dried for 3 hours in a vacuum volatilization furnace at 130° C., and afterwards dissolved in 100 g of toluene. The rubber components were precipitated and separated, and the toluene solution components were separated in 2 hours with a centrifuge separator at 20000 rpm. Methanol was added at 400 g to precipitate polymer components while stirring the toluene solution with a stirrer, and afterwards the polymer components were separated by filtering and washing with methanol. The polymer components were dried in a volatilization furnace at 130° C. for 3 hours, and were dissolved in 50 g of methylene chloride at 50° C. The precipitated polyphenylene ether was placed in a freezer at −30° C. for 24 hours, and afterwards filtered and washed with methylene chloride at −30° C., then dried in a vacuum volatilization furnace at 130° C. for 3 hours. The reduced viscosity was measured with the aforementioned method by using the precipitated polyphenylene ether obtained by drying. The unit is represented with dl/g.

(3. Measuring Method of the Number of Terminal OH Groups of the Polyphenylene Ether in the Molded Product)

The number of phenolic OH groups was calculated in the obtained precipitated polyphenylene ether, by measuring the absorbance at a measurement wavelength of 318 nm, using an ultra-violet and visible spectrophotometric (type: U-3210, made by Hitachi).

(4. Urethane Adhesion)

Pellets of the resin composition produced in the examples and the comparative examples were dried in a hot-air dryer at 90° C. for 1 hour.

A 120×120×2.5 mm plate-like molded piece was molded, by using the dried resin composition, with an injection molding machine with a mold for plate-like molded piece attached thereto (IS-80EPN, made by Toshiba Machine Co., Ltd.), at a cylinder temperature of 320° C., a mold temperature of 90° C., an injection pressure of 70 MPa (gauge pressure), an injection speed of 200 mm/sec, a measurement completion position of 100 mm, injection time/cooling time=10 sec/30 sec.

Afterwards, a foamed urethane material mixture (polyether/triethanolamine/water/triethylamine/crude methylenediisocyanate=58.1/3.0/1.5/0.6/36.8 parts by mass, 100 parts by mass in total) was applied on the aforementioned plate-like molded piece, and was foamed and cured at a condition of 50° C./30 minutes. The thickness of the foamed urethane layer was about 10 mm, and the foam density was 0.17. A piece of 20 mm width×120 mm length was cut out from a molded product obtained by attaching foamed urethane to the aforementioned plate-like molded piece produced in this way, and was slightly peeled at one end in the length direction of the molded product thereof. The foamed urethane layer of the molded product was pinched at the peeled part with one hand while the foamed urethane layer was facing downwards, and the molded product was bended up with the other hand. Here, those whereof the foamed urethane was torn without separating from the interface with the plate-like molded piece were judged as "excellent", those partially separated were judged as "good", and those separated were judged as "fail". Those whereof the evaluation criteria are "excellent" are judged as desirable for use in the automobile interior component as the molded product of the present embodiment.

(5. Resident Molding Stability)

Pellets of the resin composition produced in the examples and the comparative examples were dried in a hot-air dryer at 100° C. for 2 hours.

By using the dried resin composition, with an injection molding machine with a mold for plate-like molded piece attached thereto (IS-80EPN, made by Toshiba Machine Co., Ltd.), the conditions are set as a cylinder temperature of 300° C., a mold temperature of 90° C., an injection pressure of 70 MPa (gauge pressure), an injection speed of 200 mm/sec, a measurement completion position of 100 mm, injection time/cooling time=10 sec/30 sec. The resin composition was filled into the molding machine cylinder and resided for 30 min, and afterwards subjected to 20 times of continuous shot molding. The number of molding shots until generation of silver streaks disappears on the plate-like molded piece by visual observation was measured. The evaluation criteria is that those whereof the silver streaks disappeared before the third shot were judged as "excellent", those whereof the silver streaks disappeared before the sixth shot were judged as "good", and those whereof the silver streaks appeared even after the sixth shot were judged as "fail". Those whereof the evaluation criteria is "excellent" were judged as desirable for use in the automobile interior component as the molded product of the present embodiment.

(6. Molding Appearance)

Pellets of the resin composition produced in the examples and the comparative examples were dried in a hot-air dryer at 90° C. for 1 hour.

A 120×120×2.5 mm plate-like molded piece was molded, by using the dried resin composition, with an injection molding machine with a mold for plate-like molded piece attached thereto (IS-80EPN, made by Toshiba Machine Co., Ltd.), at a cylinder temperature of 300° C., a mold temperature of 90° C., an injection pressure of 70 MPa (gauge pressure), an injection speed of 200 mm/sec, a measurement completion position of 100 mm, injection time/cooling time=10 sec/30 sec. Afterwards, the surface appearance of the plate-like molded piece was judged by visual observation. Those whereof the molded piece surface was smooth and no silver streaks, or splinters and flow marks due to floating of glass fibers were observed were judged as "excellent", and those whereof the molded piece surface was inferior in the appearance and silver streaks, or splinters and flow marks were observed were judged as "fail". Those judged as "excellent" were judged as desirable for use in the automobile interior component as the molded product of the present embodiment.

(7. Deflection Temperature Under Load (DTUL))

Pellets of the resin composition produced in the examples and the comparative examples were dried in a hot-air dryer at 90° C. for 1 hour.

By using the dried resin composition, with an injection molding machine with a mold for ISO physical property specimen attached thereto (IS-80EPN, made by Toshiba Machine Co., Ltd.), an ISO3167 dumbbell molded piece of multipurpose test specimen A type was molded at a cylinder temperature of 300° C., a mold temperature of 90° C., an injection pressure of 50 MPa (gauge pressure), an injection speed of 200 mm/sec, a measurement completion position of 55 mm, injection time/cooling time=20 sec/20 sec. The obtained dumbbell molded piece of multipurpose test specimen A type was cut and made into a molded piece of 80 mm×10 mm×4 mm. The deflection temperature under load (DTUL) was measured by using the specimen according to ISO75 at 1.82 MPa with flatwise method. As the evaluation criteria, those having a higher DTUL value were judged as more excellent in heat resistance.

(8. Molding Fluidity (MFR))

Pellets of the resin composition produced in the examples and the comparative examples were dried in a hot-air dryer at 90° C. for 1 hour.

After drying, the MFR (melt flow rate) was measured by using a melt indexer (P-111, made by Toyo Seiki Seisakusho, Ltd.), at a cylinder set temperature of 250° C., and a load of 10 kg.

As the evaluation criteria, those having a higher measured value were judged as more excellent in molding fluidity.

(9. Tensile Strength)

The tensile strength was measured at 23° C. according to ISO527, by using the ISO3167 dumbbell molded piece of multipurpose test specimen A type produced in the aforementioned 7.

As the evaluation criteria, those having a higher measured value were judged as more excellent in mechanical properties.

(10. Bending Strength)

A molded piece of 80 mm×10 mm×4 mm was produced by cutting the ISO3167 dumbbell molded piece of multipurpose test specimen A type produced in the aforementioned 7. The bending strength was measured at 23° C., by using the specimen, according to ISO178.

As the evaluation criteria, those having a higher measured value were judged as more excellent in mechanical properties.

(11. Charpy Impact Strength)

A molded piece of 80 mm×10 mm×4 mm was produced by cutting the ISO3167 dumbbell molded piece of multipurpose test specimen A type produced in the aforementioned 7. The Charpy impact strength was measured at 23° C., by using the specimen, according to ISO179.

As the evaluation criteria, those having a higher measured value were judged as more excellent in impact resistance.

[Raw Materials]

(Polyphenylene Ether (A))

(PPE1) Nitrogen gas was blown at a flow rate of 1000 ml/min, into a 20-litter jacketed polymerization tank having a sparger, a stirring turbine blade and a baffle for introducing oxygen gas disposed on the bottom of the polymerization tank, and having a reflux condenser on the vent gas line on the upper portion of the polymerization tank, and simultaneously, 2.209 g of cupric chloride dihydrate, 9.460 g of 36% hydrochloric acid, 84.379 g of N,N,N',N'-tetramethylpropanediamine, 63.646 g of di-n-butylamine, 2528 g of n-butanol, 1088 g of methanol, 7584 g of xylene, and 320 g of 2,6-dimethylphenol were added thereinto, and were stirred until a uniform solution was formed and the internal temperature of the reactor became 40° C. Nitrogen gas was blown at a flow rate of 400 ml/min, into a 8-litter storage tank having a sparger, a stirring turbine blade and a baffle for introducing nitrogen gas on the storage tank, and a reflux condenser on the vent gas line of the upper portion of the storage tank, and simultaneously, 1440 g of methanol and 2800 g of 2,6-dimethylphenol were added thereinto, and were stirred until a uniform solution was formed, to obtain a mixed solution. Next, oxygen gas was introduced from the sparger at a flow rate of 2000 Nml/min into the polymerization tank, which was being intensely stirred, and simultaneously, the aforementioned mixed solution was added successively at a rate of 33.1 g/min from the storage tank, by using a tubing pump. Polymerization was performed while the inner temperature of the reactor was controlled at 40° C. through 290 min of the introduction. Further, 140 min after provision of oxygen gas began, a copolymer was precipitated and exhibited a slurry-like form. The form of the polymerization solution at the end of the polymerization is precipitation polymerization. After introduction of oxygen gas was ended, the polymerization mixture was added 23.0 g of a 50% water solution of an ethylenediaminetetraacetic acid tripotassium salt (a reagent made by Dojindo Molecular Technologies, Inc.), stirred for 60 min, and next gradually added a hydroquinone (a reagent made by Wako Pure Chemical Industries, Ltd.), and was continuously stirred until the slurry-like polyphenylene ether became white. The internal temperature of the reactor was controlled at 40° C. Afterwards, the residue wet polyphenylene ether after filtering was added into and dispersed in a 20-litter washing tank, together with 12800 g of methanol, and was refiltered after 30 min of stirring, to obtain a wet polyphenylene ether. The internal temperature of the washing tank was controlled at 40° C. This procedure was repeated for 3 times, and after drying at 140° C. for 240 minutes, a polyphenylene ether powder having a reduced viscosity of 0.41 dl/g was obtained.

(PPE2) Nitrogen gas was blown a flow rate of 500 ml/min into a 40-litter jacketed polymerization tank having a sparger, a stirring turbine blade and a baffle for introducing an oxygen-inclusive gas on the bottom of the polymerization tank, and having a reflux condenser on the vent gas line on the upper portion of the polymerization tank; simultaneously, 4.57 g of cupric oxide, 24.18 g of 47 mass % hydrogen bromide water solution, 11 g of di-t-butylethylenediamine, 62.72 g of di-n-butylamine, 149.92 g of butyldimethylamine, 20650 g of toluene, and 3120 g of 2,6-dimethylphenol were added, and were stirred until a uniform solution was formed and the internal temperature of the polymerization tank became 25° C.

Next, oxygen gas was introduced for 95 min from the sparger at a flow rate of 6500 Nml/min into the polymerization tank, which was being intensely stirred, and the internal temperature at the end of the polymerization was controlled at 40° C., to obtain a polymerization mixture. The polymerization mixture at the end of the polymerization was in a solution form. After blowing of oxygen gas was ended, 10 kg of 2.5 mass % water solution of an ethylenediaminetetraacetic acid tetrasodium salt (a reagent made by Dojindo Molecular Technologies, Inc.) was added into the polymerization mixture.

The polymerization mixture was stirred at 70° C. for 150 min, afterwards left standing for 20 min, and separated into an organic phase and an aqueous phase through liquid-liquid separation. The organic phase included polyphenylene ether and toluene (boiling point: 110.6° C.).

The obtained organic phase was heated to 120° C., and toluene vapor was extracted out from the system until the concentration of the polyphenylene ether in the organic phase became 36 parts by mass. After the obtained organic phase was cooled to room temperature, a slurry was produced by adding methanol to precipitate polyphenylene ether. At that time, the slurry temperature was 55° C., and polyphenylene ether concentration in the slurry was 21 mass %. Afterwards, after the slurry was filtered and the residue was further dispersed in 20000 g of methanol, a wet polyphenylene ether was obtained through refiltering. Next, a polyphenylene ether powder having a reduced viscosity of 0.38 dl/g was obtained by drying at 150° C. and 1 mmHg for 90 min.

(PPE3) Nitrogen gas was blown a flow rate of 500 ml/min into a 40-litter jacketed polymerization tank having a sparger, a stirring turbine blade and a baffle for introducing an oxygen-inclusive gas on the bottom of the polymerization tank, and having a reflux condenser on the vent gas line on the upper portion of the polymerization tank; simultaneously, 4.02 g of cupric oxide, 29.90 g of 47 mass % hydrogen bromide water solution, 9.72 g of di-t-butylethylenediamine, 46.88 g of di-n-butylamine, 122.30 g of butyldimethylamine, 17530 g of toluene, and 1500 g of 2,6-dimethylphenol were added, and were stirred until a uniform solution was formed the internal temperature of the polymerization tank became 25° C.

Further, nitrogen gas was blown at a flow rate of 400 ml/min, into a 8-litter storage tank having a sparger, a stirring turbine blade and a baffle for introducing nitrogen gas on the storage tank, and a reflux condenser on the vent gas line of the upper portion of the storage tank, and simultaneously, 3120 g of toluene and 1620 g of 2,6-dimethylphenol were added thereinto, and were mixed until a uniform solution was formed, to obtain a mixed solution. Next, oxygen gas was introduced for 90 min from the sparger at a flow rate of 6500 Nml/min into the polymerization tank, which was being intensely stirred; simultaneously, the aforementioned mixed solution was further added into the polymerization tank in 30 min through a plunger pump, and the internal temperature at the end of the polymerization was controlled at 40° C., to obtain a polymerization mixture. At the end of the polymerization, the polymerization mixture was in a solution form. After blowing of oxygen gas was ended, by performing the operation same as the production in PPE2, a polyphenylene ether powder having a reduced viscosity of 0.34 dl/g was obtained.

(PPE4) Nitrogen gas was blown into a 20-litter jacketed polymerization tank having a sparger, a stirring turbine blade and a baffle for introducing oxygen gas disposed on the bottom of the polymerization tank, and having a reflux condenser on the vent gas line on the upper portion of the polymerization tank, at a flow rate of 1000 ml/min, and simultaneously, 2.209 g of cupric chloride dihydrate, 9.460 g of 36% hydrochloric acid, 84.379 g of N,N,N',N'-tetramethylpropanediamine, 63.646 g of di-n-butylamine, 2528 g of n-butanol, 2528 g of methanol, 7584 g of xylene, and 3120 g of 2,6-dimethylphenol were added thereinto, and were mixed until a uniform solution was formed and the internal temperature of the reactor became 40° C. Next, oxygen gas was introduced from the sparger at a flow rate of 2000 Nml/min into the polymerization tank, which was being intensely stirred, and polymerization was performed while the inner temperature of the reactor was controlled at 40° C. through 290 min of introduction. Further, 125 min after provision of oxygen gas began, a copolymer was precipitated and exhibited a slurry-like form. The form of the polymerization solution at the end of the polymerization is precipitation polymerization. After blowing of oxygen gas was ended, by performing the operation same as the production in PPE1, a polyphenylene ether powder having a reduced viscosity of 0.47 dl/g was obtained.

(PPE5) Nitrogen gas was blown a flow rate of 500 ml/min into a 40-litter jacketed polymerization tank having a sparger, a stirring turbine blade and a baffle for introducing an oxygen-inclusive gas on the bottom of the polymerization tank, and having a reflux condenser on the vent gas line at on the upper portion of the polymerization tank; simultaneously, 4.57 g of cupric oxide, 24.18 g of 47 mass % hydrogen bromide water solution, 11 g of di-t-butylethylenediamine, 62.72 g of di-n-butylamine, 149.92 g of butyldimethylamine, 20650 g of toluene, and 3120 g of 2,6-dimethylphenol were added, and were stirred until a uniform solution was formed and the internal temperature of the polymerization tank became 25° C.

Further, nitrogen gas was blown at a flow rate of 400 ml/min, into a 8-litter storage tank having a sparger, a stirring turbine blade and a baffle for introducing nitrogen gas on the storage tank, and a reflux condenser on the vent gas line of the upper portion of the storage tank, and simultaneously, 3120 g of toluene, 1620 g of 2,6-dimethylphenol, and 21.56 g of butyldimethylamine were added thereinto, and were mixed until a uniform solution was formed, to obtain a mixed solution.

Next, oxygen gas was introduced for 90 min from the sparger at a flow rate of 6500 Nml/min into the polymerization tank, which was being intensely stirred; simultaneously, the aforementioned mixed solution was further added into the polymerization tank over a period of 30 min through a plunger pump, and the internal temperature at the end of the polymerization was controlled at 40° C., to obtain a polymerization mixture. At the end of the polymerization, the polymerization mixture was in a solution form. After blowing of oxygen gas was ended, 10 kg of 2.5 mass % water solution of an ethylenediaminetetraacetic acid tetrasodium salt (a reagent made by Dojindo Molecular Technologies, Inc.) was added into the polymerization mixture. The polymerization mixture was stirred at 70° C. for 150 min, afterwards left standing for 20 min, and separated into an organic phase and an aqueous phase through liquid-liquid separation. The organic phase included polyphenylene ether and toluene (boiling point: 110.6° C.).

The obtained organic phase was heated to 120° C., and toluene vapor was extracted out from the system until the concentration of the polyphenylene ether in the organic phase became 39 parts by mass. After the obtained organic phase was cooled to room temperature, a slurry was produced by adding methanol to precipitate polyphenylene ether. At that time, the slurry temperature was 5° C., and polyphenylene ether concentration in the slurry was 22 mass %. Afterwards, after the slurry was filtered and the residue was further dispersed in 20000 g of methanol, a wet polyphenylene ether was obtained through refiltering. Next, a polyphenylene ether powder having a reduced viscosity of 0.24 dl/g was obtained by drying at 150° C. and 1 mmHg for 90 min.

(PPE6) Adjustment of Functional Polyphenylene Ether

By using a ZSK25 twin screw extruder (made by Werner & Pfleiderer, Germany, barrels: 10, screw diameter: 25 mm; at a screw pattern that kneading discs L: 2, kneading discs R: 6 and kneading discs N: 2), 100 parts by mass of the aforementioned (PPE4), 3 parts by mass of maleic anhydride, and 0.5 parts by mass of dicumyl peroxide were melted and kneaded at a barrel set temperature of 320° C. and a screw rotation number of 250 rpm, to obtain pellets of maleic anhydride modified polyphenylene ether. The total amount of maleic anhydride, which was determined through titration of sodium methylate, was 1.5 parts by mass per 100 parts by mass of the modified polyphenylene ether. The reduced viscosity was 0.47 dl/g.

(Polystyrene (B))

(HIPS) Used was a high impact polystyrene (trade name: PS6200®, made by Nova Chemicals, U.S.).

(GPPS) Used was a general purpose polystyrene (trade name: Styron660®, made by the Dow Chemicals, U.S.).

(Glass Fiber (C))

(GF1) Used was a chopped strand having an average fiber diameter of 10 μm, and a cut length of 3 mm, which was subjected to surface treatment with an aminosilane compound, and was sized with a urethane sizing agent.

(GF2) Used was a chopped strand having an average fiber diameter of 10 μm, and a cut length of 3 mm, which was subjected to surface treatment with an aminosilane compound, and was sized with an epoxy sizing agent.

Example 1

In this case, 15 parts by mass of (PPE1), 35 parts by mass of (HIPS) and 30 parts by mass of (GPPS) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 20 parts by mass of (GF1) were side fed from a barrel 6 at a midstream, and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.44 dl/g, and the number of terminal OH groups was 106 μmol/g. The test results of physical properties of the resin composition are as shown in Table 1.

Example 2

Except for replacing (PPE1) with (PPE2), a resin composition was obtained by melting and kneading at the same kneading conditions as Example 1. The reduced viscosity of the polyphenylene ether in the molded product of the obtained resin composition was 0.42 dl/g, and the number of terminal OH groups was 145 μmol/g. The test results of physical properties of the resin composition are as shown in Table 1.

Example 3

Except for replacing (PPE1) with (PPE3), a resin composition was obtained by melting and kneading at the same kneading conditions as Example 1. The reduced viscosity of the polyphenylene ether in the molded product of the obtained resin composition was 0.37 dl/g, and the number of terminal OH groups was 192 μmol/g. The test results of physical properties of the resin composition are as shown in Table 1.

Example 4

Except for replacing (GF1) with (GF2), a resin composition was obtained by melting and kneading at the same kneading conditions as Example 2. The reduced viscosity in the molded product of the obtained resin composition was 0.42 dl/g, and the number of terminal OH groups of the polyphenylene ether was 147 μmol/g. The test results of physical properties of the resin composition are as shown in Table 1.

Example 5

Except for replacing 3 parts by mass within the 15 parts by mass of (PPE2) with (PPE6), a resin composition was obtained by melting and kneading at the same kneading conditions as Example 4. The reduced viscosity of the polyphenylene ether in the molded product of the obtained resin composition was 0.40 dl/g, and the number of terminal OH groups was 144 μmol/g. The test results of physical properties of the resin composition are as shown in Table 1.

Example 6

Except for replacing 8 parts by mass within the 15 parts by mass of (PPE2) with (PPE6), a resin composition was obtained by melting and kneading at the same kneading conditions as Example 4. The reduced viscosity of the polyphenylene ether in the molded product of the obtained resin composition was 0.43 dl/g, and the number of terminal OH groups was 134 μmol/g. The test results of physical properties of the resin composition are as shown in Table 1.

Example 7

In this case, 21 parts by weight of (PPE2), 34 parts by weight of (HIPS) and 30 parts by weight of (GPPS) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 15 parts by weight of (GF1) were side fed from a barrel 6 at a midstream, and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.43 dl/g, and the number of terminal OH groups was 146 μmol/g. The test results of physical properties of the resin composition are as shown in Table 1.

Example 8

In this case, 10 parts by weight of (PPE2), 35 parts by weight of (HIPS) and 30 parts by weight of (GPPS) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 25 parts by weight of (GF1) was side fed from a barrel 6 at a midstream, and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.40 dl/g, and the number of terminal OH groups was 143 μmol/g. The test results of physical properties of the resin composition are as shown in Table 1.

Example 9

In this case, 28 parts by weight of (PPE2), 30 parts by weight of (HIPS) and 32 parts by weight of (GPPS) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 10 parts by weight of (GF1) was side fed from a barrel 6 at a midstream, and a resin composition was obtained by melting and kneading at a cylinder temperature 320° C., a screw rotation number of 250 rpm, and an extrusion rate of 10 kg/h.

The reduced viscosity of the polyphenylene ether in the molded product of the obtained resin composition was 0.44 dl/g, and the number of terminal OH groups was 145 μmol/g. The test results of physical properties of the resin composition are as shown in Table 1.

Comparative Example 1

Except for replacing (PPE2) with (PPE4), a resin composition was obtained by melting and kneading at the same kneading conditions as Example 4. The reduced viscosity of the polyphenylene ether in the molded product of the obtained resin composition was 0.51 dl/g, and the number of terminal OH groups was 89 μmol/g. The test results of physical properties of the resin composition are as shown in Table 2.

Comparative Example 2

Except for replacing 10 parts by mass within the 15 parts by mass of (PPE4) with (PPE6), a resin composition was obtained by melting and kneading at the same kneading conditions as Comparative Example 1. The reduced viscosity of the polyphenylene ether in the molded product of the obtained resin composition was 0.49 dl/g, and the number of terminal OH groups was 93 μmol/g. The test results of physical properties of the resin composition are as shown in Table 2.

Comparative Example 3

Except for replacing (PPE4) with (PPE6), a resin composition was obtained by melting and kneading at the same kneading conditions as Comparative Example 1. The reduced viscosity of the polyphenylene ether in the molded product of the obtained resin composition was 0.48 dl/g, and the number of terminal OH groups was 94 μmol/g. The test results of physical properties of the resin composition are as shown in Table 2.

Comparative Example 4

Except for replacing (PPE2) with (PPE5), a resin composition was obtained by melting and kneading at the same kneading conditions as Example 4. The reduced viscosity of the polyphenylene ether in the molded product of the obtained resin composition was 0.27 dl/g, and the number of terminal OH groups was 223 µmol/g. The test results of physical properties of the resin composition are as shown in Table 2.

Comparative Example 5

In this case, 21 parts by mass of (PPE4), 34 parts by mass of (HIPS), 25 parts by mass of (GPPS), and 5 parts by mass of a styrene-maleic anhydride copolymer (SMA (trade name: Dylark D332®, copolymerization amount of maleic anhydride: 15 parts by mass, made by Nova Chemicals, Japan)) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 15 parts by weight of (GF2) was side fed from a barrel 6 at a midstream, and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.52 dl/g, and the number of terminal OH groups was 87 µmol/g. The test results of physical properties of the resin composition are as shown in Table 2.

Comparative Example 6

In this case, 21 parts by mass of (PPE4), 34 parts by mass of (HIPS), 20 parts by mass of (GPPS), and 10 parts by mass of a terpene-phenol resin (trade name: Mighty Ace K125®, made by Yasuhara Chemical Co., Ltd.) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 15 parts by weight of (GF2) was side fed from a barrel 6 at a midstream, and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.50 dl/g, and the number of terminal OH groups was 92 µmol/g. The test results of physical properties of the resin composition are as shown in Table 2.

Comparative Example 7

In this case, 5 parts by mass of (PPE2), 40 parts by mass of (HIPS), and 35 parts by mass of (GPPS) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 20 parts by weight of (GF1) was side fed from a barrel 6 at a midstream, and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.42 dl/g, and the number of terminal OH groups was 144 µmol/g. The test results of physical properties of the resin composition are as shown in Table 2.

Comparative Example 8

In this case, 35 parts by mass of (PPE2), 25 parts by mass of (HIPS), and 20 parts by mass of (GPPS) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 20 parts by weight of (GF1) was side fed from a barrel 6 at a midstream, and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.46 dl/g, and the number of terminal OH groups was 166 µmol/g. The test results of physical properties of the resin composition are as shown in Table 2.

Comparative Example 9

In this case, 28 parts by mass of (PPE2), 42 parts by mass of (HIPS), and 30 parts by mass of (GPPS) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.45 dl/g, and the number of terminal OH groups was 146 µmol/g. The test results of physical properties of the resin composition are as shown in Table 2.

Comparative Example 10

In this case, 21 parts by mass of (PPE2), 24 parts by mass of (HIPS), and 20 parts by mass of (GPPS) were fed from an uppermost stream (top feed) of a ZSK25 twin screw extruder, made by Werner & Pfleiderer, Germany, barrels: 10, screw diameter: 25 mm (at a screw pattern that kneading discs L: 2, kneading discs R: 6, and kneading discs N: 4), 35 parts by weight of (GF1) was side fed from a barrel 6 at a midstream, and a resin composition was obtained by melting and kneading at a cylinder temperature 320° C., a screw rotation number of 250 rpm, and an extrusion rate of 10 kg/h. The reduced viscosity of the polyphenylene ether in the molded product of the obtained resin composition was 0.45 dl/g, and the number of terminal OH groups was 171 µmol/g. The test results of physical properties of the resin composition are as shown in Table 2.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| [Compound composition] | | | | | | | | | |
| **Component (A) *1** | | | | | | | | | |
| PPE1 ($\eta sp/c$: 0.41) | 15 | | | | | | | | |
| PPE2 ($\eta sp/c$: 0.38) | | 15 | | 15 | 12 | 7 | 21 | 10 | 28 |
| PPE3 ($\eta sp/c$: 0.34) | | | 15 | | | | | | |
| PPE4 ($\eta sp/c$: 0.47) | | | | | | | | | |
| PPE5 ($\eta sp/c$: 0.24) | | | | | | | | | |
| PPE6 ($\eta sp/c$: 0.47) *2 | | | | | 3 | 8 | | | |
| Component (B) | | | | | | | | | |
| HIPS | 35 | 35 | 35 | 35 | 35 | 35 | 34 | 35 | 30 |
| GPPS | 30 | 30 | 30 | 30 | 30 | 30 | 30 | 30 | 32 |
| Component (C) | | | | | | | | | |
| GF1 (urethan sizing agent) | 20 | 20 | 20 | | | | 15 | 25 | 10 |
| GF2 (epoxy sizing agent) | | | | 20 | 20 | 20 | | | |
| (Other components) | | | | | | | | | |
| Styrene-maleic anhydride copolymer | | | | | | | | | |
| Terpene-phenol resin | | | | | | | | | |
| Total | 100 | 100 | 100 | 100 | 100 | 100 | 100 | 100 | 100 |
| Reduced viscosity $\eta sp/c$ of PPE in molded product (dl/g) | 0.44 | 0.42 | 0.37 | 0.42 | 0.40 | 0.43 | 0.43 | 0.40 | 0.44 |
| Number of OH groups at the end of PPE in molded product ($\mu mol/g$) | 106 | 145 | 192 | 147 | 144 | 134 | 146 | 143 | 145 |
| [Physical properties] | | | | | | | | | |
| DTUL (° C.) | 115 | 117 | 118 | 114 | 115 | 117 | 118 | 110 | 115 |
| MFR (g/10 min) | 24 | 24 | 21 | 22 | 22 | 21 | 13 | 46 | 15 |
| Tensile strength (MPa) | 94 | 99 | 90 | 87 | 99 | 108 | 84 | 112 | 84 |
| Bending strength (MPa) | 156 | 161 | 155 | 146 | 162 | 168 | 130 | 173 | 123 |
| Charpy impact resistance (kJ/m2) | 11 | 14 | 11 | 10 | 12 | 14 | 7.6 | 17 | 7.5 |
| Appearance after molding | Excellent | Excellent | Excellent | Excellent | Excellent | Excellent | Excellent | Excellent | Excellent |
| Resident molding stability | Excellent | Excellent | Excellent | Excellent | Excellent | Excellent | Excellent | Excellent | Excellent |
| Number of molding shots until generation of silver streaks disappears | 1 | 1 | 3 | 2 | 2 | 3 | 1 | 1 | 1 |
| Urethane adhesion | Excellent | Excellent | Excellent | Excellent | Excellent | Excellent | Excellent | Excellent | Excellent |

*1: Reduced viscosity of PPE as the material is shown in parentheses.
*2: Maleic anhydride modified polyphenylene ether

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| [Compound composition] | | | | | | | | | | |
| **Component (A) *1** | | | | | | | | | | |
| PPE1 ($\eta sp/c$: 0.41) | | | | | | | | | | |
| PPE2 ($\eta sp/c$: 0.38) | | | | | | | 5 | 35 | 28 | 21 |
| PPE3 ($\eta sp/c$: 0.34) | | | | | | | | | | |
| PPE4 ($\eta sp/c$: 0.47) | 15 | 5 | | | 21 | 21 | | | | |
| PPE5 ($\eta sp/c$: 0.24) | | | | 15 | | | | | | |
| PPE6 ($\eta sp/c$: 0.47) *2 | | 10 | 15 | | | | | | | |
| Component (B) | | | | | | | | | | |
| HIPS | 35 | 35 | 35 | 35 | 34 | 34 | 40 | 25 | 42 | 24 |
| GPPS | 30 | 30 | 30 | 30 | 25 | 20 | 35 | 20 | 30 | 20 |
| Component (C) | | | | | | | | | | |
| GF1 (urethan sizing agent) | | | | | | | 20 | 20 | | 35 |
| GF2 (epoxy sizing agent) | 20 | 20 | 20 | 20 | 15 | 15 | | | | |
| (Other components) | | | | | | | | | | |
| Styrene-maleic anhydride copolymer | | | | | 5 | | | | | |
| Terpene-phenol resin | | | | | | 10 | | | | |
| Total | 100 | 100 | 100 | 100 | 100 | 100 | 100 | 100 | 100 | 100 |
| Reduced viscosity $\eta sp/c$ of PPE in molded product | 0.51 | 0.49 | 0.48 | 0.27 | 0.52 | 0.50 | 0.42 | 0.46 | 0.45 | 0.45 |

TABLE 2-continued

|  | Comparative Example 1 | Comparative Example 2 | Comparative Example 3 | Comparative Example 4 | Comparative Example 6 | Comparative Example 6 | Comparative Example 7 | Comparative Example 8 | Comparative Example 9 | Comparative Example 10 |
|---|---|---|---|---|---|---|---|---|---|---|
| Number of OH groups at the end of PPE in molded product (μmol/g) | 89 | 93 | 94 | 223 | 87 | 92 | 144 | 166 | 146 | 171 |
| [Physical properties] | | | | | | | | | | |
| DTUL (° C.) | 115 | 115 | 114 | 115 | 113 | 119 | 101 | 136 | 104 | 134 |
| MER (g/10 min) | 24 | 24 | 20 | 48 | 16 | 21 | 57 | 2.1 | 26 | 5.4 |
| Tensile strength (MPa) | 93 | 96 | 93 | 67 | 64 | 83 | 94 | 102 | 57 | 136 |
| Bending strength (MPa) | 155 | 163 | 148 | 121 | 112 | 130 | 152 | 164 | 86 | 191 |
| Charpy impact resistance (kJ/m2) | 11 | 12 | 10 | 8.4 | 5.4 | 5.2 | 12 | 15 | 8.9 | 12 |
| Appearance after molding | Excellent | Excellent | Excellent | Fail (silver streak) | Excellent | Excellent | Excellent | Fail | Excellent | Fail |
| Resident molding stability | Excellent | Excellent | Good | Fail | Fail | Fail | Excellent | Excellent | Excellent | Excellent |
| Number of molding shots until generation of silver streaks disappears | 1 | 3 | 5 | Remaining | 12 | Remaining | 1 | 2 | 2 | 3 |
| Urethane adhesion | Fail | Good | Good | Excellent | Excellent | Excellent | Good | Excellent | Fail | Excellent |

*1: Reduced viscosity of PPE as the material is shown in parentheses.
*2: Maleic anhydride modified polyphenylene ether According to Table 1, as for the resin compositions of Examples 1 to 9, both the number of terminal OH groups of the polyphenylene ether in the resin composition and the compounding amounts of each raw material satisfy the definition of this disclosure, and physical properties thereof such as the mechanical properties (tensile strength/bending strength), the impact resistance (Charpy), the molding appearance, the urethane adhesion, the resident molding stability and the like are excellent as well, and the resin compositions are preferable to be used in automobile interior components. In particular, Examples 1 to 3 and Examples 7 to 9, which use a glass fiber sized with a urethane sizing agent (GF1), and Examples 5 and 6, which have a maleic anhydride modified polyphenylene ether compounded at a determined amount, have an excellent balance of physical properties, and are thus preferable to be used in automobile interior components, in particular, instrument panels.

According to Table 2, Comparative Example 1 falls out of the lower limit defined in this disclosure of the number of terminal OH groups of the polyphenylene ether in the resin composition, and is thus insufficient in urethane adhesion of the molded product.

Comparative Examples 2 and 3 fall out of the lower limit defined in this disclosure of the number of terminal OH groups of the polyphenylene ether in the resin composition, and are thus insufficient in urethane adhesion of the molded product. Comparative Example 2 exhibits a tendency of improvement in urethane adhesion by compounding a maleic anhydride modified polyphenylene ether at a determined amount, but is insufficient.

Although having maleic anhydride modified polyphenylene ether compounded at an amount further more than defined, Comparative Example 3 did not become sufficient in urethane adhesion, but was deteriorated in resident molding stability on the contrary.

Comparative Example 4 falls out of the upper limit defined in this disclosure of the number of terminal OH groups of the polyphenylene ether in the resin composition, and is thus insufficient in resident molding stability of the resin composition, mechanical properties of the molded product and appearance of the molded product (generation of silver streaks).

Comparative Example 5 falls out of the lower limit defined in this disclosure of the number of terminal OH groups of the polyphenylene ether in the resin composition, but is excellent in urethane adhesion by having a styrene-maleic anhydride copolymer compounded. However, resident molding stability, mechanical properties and impact resistance of the resin composition thereof are insufficient.

Comparative Example 6 falls out of the lower limit defined in this disclosure of the number of terminal OH groups of the polyphenylene ether in the resin composition, but is excellent in urethane adhesion as well by having a terpene-phenol resin compounded. However, resident molding stability and impact resistance of the resin composition thereof are insufficient.

Comparative Example 7 falls out of the lower limit defined in this disclosure of the compounding amount of polyphenylene ether in the resin composition, and is thus insufficient in urethane adhesion.

Comparative Example 8 falls out of the upper limit defined in this disclosure of the compounding amount of polyphenylene ether in the resin composition, and is thus insufficient in appearance of the molded product, due to flow marks and floating of glass fibers on the surface of the molded product.

Comparative Example 9 does not have a glass fiber compounded as the component (C) of this disclosure in the resin composition, and is thus insufficient in mechanical properties and urethane adhesion.

Comparative Example 10 falls out of the upper limit defined in this disclosure of the compounding amount of glass fiber in the resin composition, and is thus insufficient in appearance of the molded product, due to flow marks and floating of glass fibers on the surface of the molded product.

Accordingly, Comparative Examples 1 to 10 can hardly be used in automobile interior components, in particular, instrument panel components.

INDUSTRIAL APPLICABILITY

A molded product formed of the resin composition of this disclosure is excellent in urethane adhesion, and also significantly excellent in resident molding stability, surface appearance of the molded product, mechanical properties and impact resistance, and thus can be used effectively in automobile interior components, in particular, instrument panel components.

The invention claimed is:

1. An automobile interior component formed of a reinforced polyphenylene ether-based resin composition, comprising: a polyphenylene ether (A) whereof the reduced viscosity in the molded product (chloroform solvent, measured at 30° C.) is 0.30 to 0.45 dl/g; a styrene-based resin (B) selected from polystyrene, high impact polystyrene (HIPS), and a mixture thereof; and a glass fiber (C), wherein
the content of the component (A) is 10 to 30 mass%, the content of the component (B) is 50 to 85 mass%, and the content of the component (C) is 5 to 30 mass%, in 100 mass% in total of the components (A) to (C),
wherein the number of terminal OH groups of the polyphenylene ether of the component (A) in the molded product is 100 to 200 µmol/g.

2. The automobile interior component formed of the reinforced polyphenylene ether-based resin composition according to claim 1, wherein the component (C) is a glass fiber sized with a urethane sizing agent.

3. The automobile interior component formed of the reinforced polyphenylene ether-based resin composition according to claim 1, wherein the automobile interior component is an instrument panel component.

4. The automobile interior component formed of the reinforced polyphenylene ether-based resin composition according to claim 2, wherein the automobile interior component is an instrument panel component.

* * * * *